Figure 8:
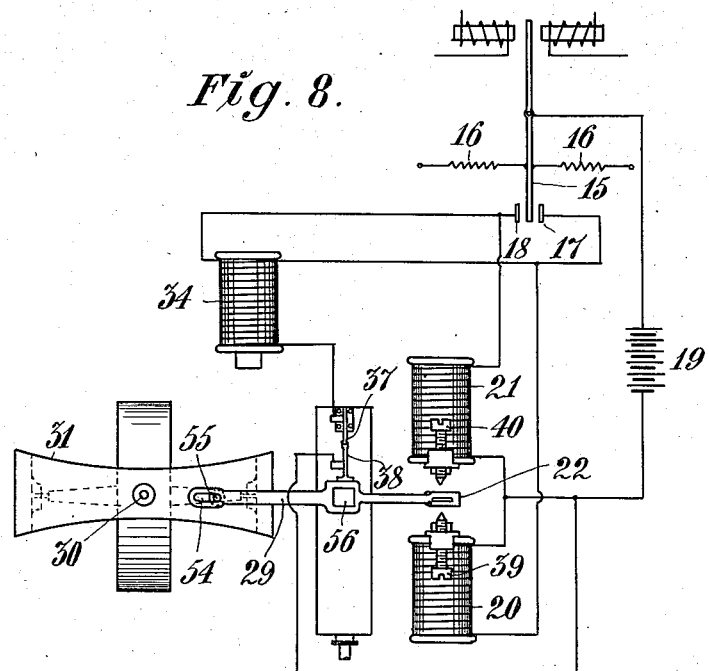

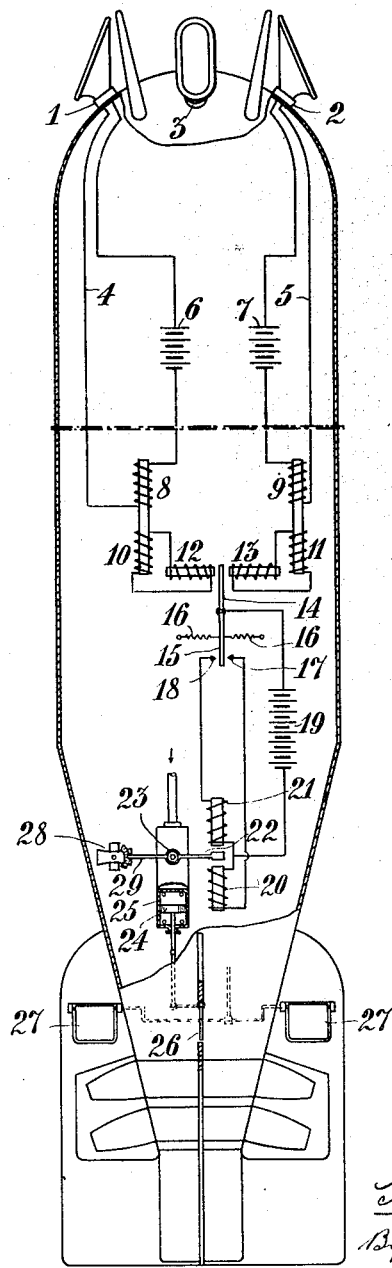

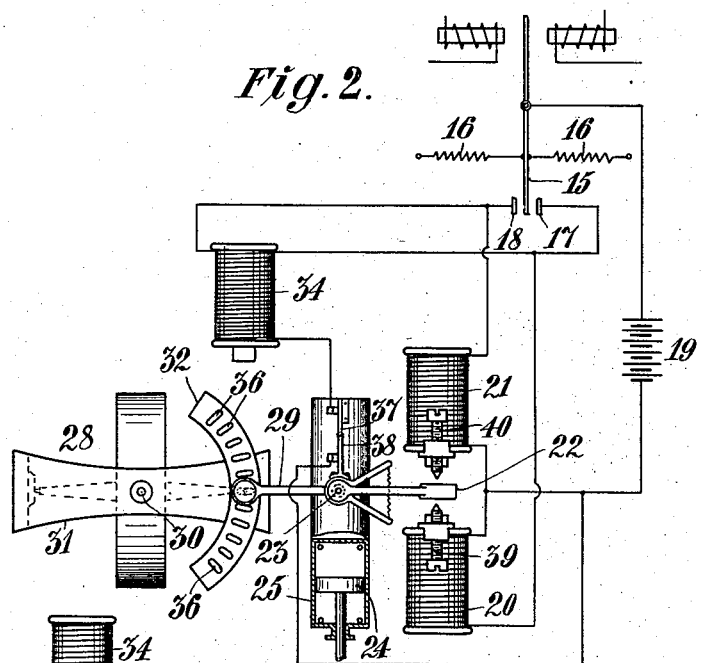

K. O. LEON.
MEANS FOR AUTOMATICALLY STEERING TORPEDOES OR THE LIKE.
APPLICATION FILED NOV. 22, 1910.

1,121,563.

Patented Dec. 15, 1914.

3 SHEETS—SHEET 3.

Witnesses
Fred White
J. F. Wallace

Inventor
Karl Oskar Leon,
By his Attorneys:

UNITED STATES PATENT OFFICE.

KARL OSKAR LEON, OF NEW YORK, N. Y., ASSIGNOR TO LEON STEERING DEVICE COMPANY, OF BROOKLYN, NEW YORK, A CORPORATION OF NEW YORK.

MEANS FOR AUTOMATICALLY STEERING TORPEDOES OR THE LIKE.

1,121,563. Specification of Letters Patent. Patented Dec. 15, 1914.

Application filed November 22, 1910. Serial No. 593,623.

*To all whom it may concern:*

Be it known that I, KARL OSKAR LEON, a subject of the King of Sweden, residing at New York, in the county and State of New York, have invented new and useful Improvements in Means for Automatically Steering Torpedoes or the like, of which the following is a specification, reference being had to the drawings accompanying and forming a part hereof.

This invention relates to means for automatically steering torpedoes or other bodies movable in water by means of a gyroscope and receivers for waves of sound or other vibrations of the water. The gyroscope serves to maintain the original course of the torpedo until the latter has arrived so near the sounding object to be hit that the sound receivers become operative. Inasmuch as the gyroscope always tends to maintain the course of the torpedo it is necessary, in order to enable steering by means of receivers for sound or the like to be performed, that the gyroscope be disconnected when the sound receivers are to actuate the rudder or rudders.

The object of this invention is to effect such an automatic disconnection of the gyroscope, either temporary or permanent, when the sound receivers begin to operate.

A further object of the invention is to minimize the effect of temporary sounds on the path of the torpedo.

The invention consists, chiefly, in the method and means for controlling the movement of torpedoes hereinafter set forth as well as in the construction and combination of parts described and pointed out in the claims.

According to this invention the receivers are, preferably, connected to relays or other devices controlled by the same, said devices being adapted to break the connection between the gyroscope and the reversing apparatus actuating the rudder or rudders. Preferably, the gyroscope and the sound receivers coöperate in such a manner that the gyroscope is instantaneously disconnected and again thrown into action as soon as one or more receivers are influenced by sufficiently strong waves of sound or the like. By this means each sufficiently strong sound will only temporarily turn the corresponding rudder, said turning of the rudder being periodically repeated as long as the sound continues, by which the torpedo is successively swung toward the source of sound, while, when the sound ceases, the gyroscope tends to maintain the course of the torpedo.

In the accompanying drawings some arrangements for carrying the invention into effect are schematically shown.

Figure 9:
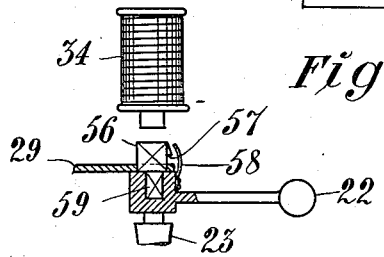
Figure 10:
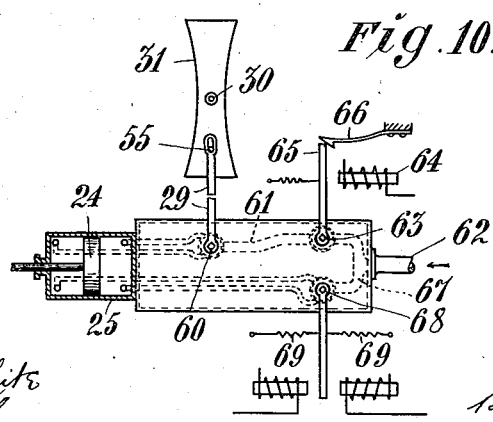

Figure 1 shows schematically a torpedo with sound receivers, relays and reversing apparatus for the rudders. Fig. 2 is a plan view of the reversing apparatus with the gyroscope operating the same and the electromagnets controlled by the sound receivers and relays. Fig. 3 is a side view of a part of the gyroscope and its connection with the controlling valve for admitting the pressure fluid at one or the other side of the servo-motor piston operating the rudders. Figs. 4 and 5 are similar side views of a part of the gyroscope showing two modifications of the connection between the gyroscope and the controlling valve. Fig. 6 is a plan view of a further modification of the said connection. Fig. 7 is a detail view showing the said connection viewed from the end (left-hand side of Fig. 6). Fig. 8 is a plan view of a modified device adapted to permanently disconnect the gyroscope when the sound receivers are actuated. Fig. 9 shows a detail of the said device viewed from the side (partly in section). Fig. 10 is a plan view of a further modification of the arrangement for permanently disconnecting the gyroscope, in which the gyroscope and the sound receivers operate different valves each placed in one of two branches of the pressure conduit.

In the particular form of the torpedo schematically shown in Fig. 1, the torpedo is provided at its fore end, as in the drawing of my prior patent application 415309, with four sound receivers (microphones, telephonic receivers or other instruments sensitive to waves of sound or pressure respectively) placed in the circumference of a circle, two of said receivers, 1 and 2, serving to steer the torpedo in the horizontal plane, while the two others, of which only one 3 is visible, serve to steer the torpedo in the vertical plane. Each receiver is inserted in an electric circuit, for instance the receivers 1 and 2 in each of the circuits 4 and 5. Included in each of the circuits 4 and 5 are further a battery or other electric current source 6 or 7 respectively and the primary winding 8 or 9 respectively of an induction coil whose secondary winding 10 or 11 respectively serves as a secondary current source for exciting the corresponding winding 12 or 13 respectively of an alternating current relay acting on an armature 14 connected to a switch arm 15. Obviously, the invention is not limited to the constructional form shown by way of example, since the connection of the receivers with the relay and the arrangement of the latter may be varied considerably and in various ways. Instead of an alternating current relay a continuous current relay may be employed if the currents from the induction coils are transformed in any suitable way into continuous current. Inasmuch as a continuous current relay may be made much more sensitive than an alternating current relay the latter arrangement is preferred but as the invention is not limited to any particular arrangement of the connection between the sound receivers and the relay nor to any arrangement of the said relay a particular description of this or other modifications adapted to be used is thought to be unnecessary.

The switch arm 15 is normally held by springs 16 or otherwise in a middle position in which the arm 15 is out of contact with its contact pieces 17, 18. Accordingly as the current in one or the other of the windings 12, 13 prevails, the armature 14 is attracted in one or the other direction and places the switch arm 15 on one or the other of the contacts 17, 18. When this takes place, a current from a battery 19 or other electric current source flows through the winding of one or the other of two electromagnets 20, 21 acting on a valve-operating arm 22 forming a common armature. When the arm 22 is attracted by one or the other electromagnet 20, 21 respectively, the valve 23 is opened in such a manner that the pressure fluid is admitted on one or the other side of the piston 24 of the servomotor 25. The said piston acts through any suitable connection on one or more rudders 26 which are thereby turned in one or the other direction according as one or the other receiver is stronger influenced by the sound waves than the others. The receivers placed in the vertical plane act in a similar manner on two depth-regulating rudders 27.

In order to cause the torpedo to move under normal conditions in the direction in which it was launched, a gyroscope 28 is connected by an arm 29 to the valve 23 in such a manner that the valve is opened for admitting the pressure fluid on one or the other side of the piston 24 as soon as the torpedo departs from its original course. The rudders are thereby turned in such a manner that the torpedo is caused to turn toward the original direction. Inasmuch as the gyroscope and the sound receivers thus counteract each other, means are provided, according to this invention, for allowing the sound receivers to act without hinder of the gyroscope. To this end the arrangement shown in Figs. 2 and 3 may suitably be employed.

Screwed or otherwise attached to the gyroscope frame 31 swingable on vertical pivots 30 is an arc or sector 32 adapted to be engaged in any suitable way by the valve-operating arm 29. In the embodiment shown in Figs. 2 and 3, a vertically movable piston 33 or the like is placed in the outer end of the valve-operating arm 29, said piston forming the armature of an electromagnet 34 and provided at its lower end with a pin 35 or the like normally engaging a corresponding recess or cavity 36 in the arc 32. As shown in Fig. 2, the arc 32 is provided with a series of such recesses 36, so that, when the armature 33 has been attracted by the electromagnet 34, the said armature 33 is caused to drop into the next recess, and so on. The electromagnet 34 which, in order to avoid confusion, is shown turned in Fig. 2 an angle of 90° out of its real position, is suitably provided with two windings each connected to one of the contact pieces 17, 18 of the relay, so that, when the switch arm 15 is placed on one or the other of the said contact pieces, the corresponding winding of the electromagnet 34 is connected to one pole of the battery 19. The other end of each winding of the electromagnet 34 is connected to a contact piece 37. When the valve 23 is closed, a contact finger 38 connected to the other pole of the battery 19 bears on the said contact piece 37. As soon as the valve 23 is opened either way the contact 37, 38 is immediately broken so that the electromagnet 34 is deprived of current.

The arm 22 is suitably connected by springs to the arm 29, which forms the valve-operating arm proper by which the valve 23 is opened and closed, whereas the opening of the valve by means of the arm 22 can only be effected when the arm 29 is out of engagement with the arc 32.

The last described device works as follows. When one of a pair of sound receivers is actuated stronger than the other so that the switch arm 15 is thrown against one or the other of the contacts 17, 18, a circuit for the battery 19 is closed through one winding of the electromagnet 34 and the contact pieces 37, 38 so that the electromagnet 34 attracts its armature 33 causing the pin 35 to move out of engagement with the arc 32. At the same time a current flows from the battery 19 through one or the other of the electromagnets 20, 21, suppose through the electromagnet 20, so that the arm 22 is attracted by the said electromagnet, and the arm 29, which has been disengaged by the electromagnet 34, and which is connected by springs to the arm 22, is caused to turn correspondingly (upward in Fig. 2). Since the contact finger 38 partakes in the swinging movement of the arm 29, the circuit through the electromagnet 34 is broken at the contacts 37, 38 and the electromagnet 34 drops its armature 33. The turning movement of the arms 22, 29 is adjusted by suitable means, shown in Fig. 2 in the form of set screws 39, 40, so that, when the armature 33 drops, the pin 35 enters into engagement with the adjacent recess 36 in the arc 32. On account of the turning movement of the valve-operating arms the valve 23 is opened so that the pressure fluid is admitted at one side of the piston and the rudders are turned in a direction causing the torpedo to turn toward the source of the waves of sound. On account of the departure of the torpedo from its original course the gyroscope causes the arm 29 to swing back into its middle position so that the valve 23 is again closed. The contact 37, 38 being thus again closed, the electromagnet 34 is again supplied with current from the battery 19 (provided the switch arm 15 still bears on the contact piece 17) and again attracts its armature 33 so that the valve-operating arm 29 is disengaged from the gyroscope and caused by the electromagnet 20 to perform a new swinging. Hereby the contact 37, 38 is again opened so that the electromagnet 34 is deprived of current and releases its armature 33 which then drops into the next recess in the arc, i.e. the second recess counted from that in which the pin 35 was originally engaged. The gyroscope, which is thus again thrown into operation, thereupon again moves the valve-operating arm back into its middle position, and so on. The torpedo will thus be turned by steps toward the source of sound until the longitudinal axis of the torpedo has come so nearly in line with the direction of the waves of sound that the switch arm 15 is retracted by its springs 16 into inoperative position and breaks the current from battery 19 through the electromagnet 19. If this takes place while the arm 22 is in attracted position, the arm will still remain in the said position and the valve will remain open until the torpedo has turned a further small angle toward the source of sound and, on account thereof, the arm 29 has been moved back by the gyroscope into its middle position, by which the valve 23 is closed and the rudders are placed midships. A similar operation will take place if the switch arm 15 is thrown against the contact piece 18. The only difference will be that in such case the electromagnet 21 will operate and move the arm 29 in opposite direction into engagement with one after the other of the recesses 36 in the arc so that the torpedo is caused to turn correspondingly. By this arrangement incidental waves of sound will have only a small influence on the path of the torpedo, since such waves will effect only a small turning of the torpedo. When the sound ceases, the torpedo is again controlled by the gyroscope so as to retain its new course which will only slightly depart from the original one. The described arrangement also enables a more reliable steering within the so-called dead angle.

In order to allow the gyroscope to turn notwithstanding its engagement with the arm 29, the recesses 36 in the arc 32 have been made oblong in shape so that the pin 35 can slide in the longitudinal direction of a recess.

It is obvious that the means for connecting the arm 29 with the gyroscope frame may be varied in several respects. In Fig. 4 the gyroscope frame 31 is shown provided with an arc 41 having a filling 42 of a soft metal adapted to be engaged by the pointed lower part 43 of the armature 44, which is pressed by a spring 45 against the said filling. Since the angle of turning of the torpedo after each attraction of the arm 22 is obviously equal to the angle of turning of the valve-operating arm, the last arrangement enables the size of the angle of turning of the torpedo toward the normal of the waves of sound to be regulated by correspondingly adjusting the angular stroke of the valve-operating arm. In order to prevent the locking of the gyroscope on account of the engagement of the point 43 with the arc 42, the hole 46 in the arm which receives the plug of the valve may be made oblong in shape, as shown, so that the said arm is free to move in its longitudinal direction.

Another arrangement for preventing the locking of the gyroscope is shown in Fig. 5. This arrangement resembles that shown in Fig. 4, the chief difference being that the armature 44 and the spring 45 acting thereon are placed in a sleeve 48 movable in an oblong slot 47 in the arm 29, said sleeve having pins 49 engaging corresponding holes in the arm 29 so that the sleeve 48 with the armature is free to move in the longitudinal direction of the arm. A spring 51 tends to normally keep the sleeve 48 pressed against the outer end of the slot 47 in the arm 29.

A further modification of the connection of the gyroscope with the controlling valve is shown in Figs. 6 and 7. The gyroscope frame 31 is shown provided with a toothed arc 52 engaged by a pawl 53 pivotally connected to the valve-operating arm 29, said pawl sliding longitudinally between the teeth of the arc when the gyroscope turns.

As stated in the preamble of the specification the arrangement may be such that the gyroscope is entirely thrown out of operation as soon as the relay controlled by the sound receivers operates. Such an arrangement is shown in Figs. 8 and 9. The valve-operating arm 29 is provided at its outer end with an oblong hole 54 engaged by a pin 55 on the gyroscope frame 31. In this case the electromagnet 34 is placed just above the valve plug 23 (also in Fig. 8, in order to avoid confusion, the electromagnet 34 is shown in another position than the actual) and acts on an armature 56 placed above the valve plug. This armature is angular in shape and engages corresponding recesses in the hubs of the arms 22 and 29. Said armature carries a pawl 57 coöperating with a spring 58 which allows the armature to be attracted by the electromagnet 34 but prevents it from dropping when the said electromagnet is deprived of current. The lower part 59 of the armature 56 is narrower than the upper one so that, when the armature has been attracted, the arm 29 can freely turn around the part 59. The gyroscope thus controls the path of the torpedo only as long as the armature 56 remains in its original position. When the armature 56 has once been attracted, the gyroscope has no further influence on the steering which is thereupon controlled by the sound receivers solely.

Another arrangement for permanently disconnecting the gyroscope is shown in Fig. 10. The gyroscope here acts on a separate valve 60 inserted into a branch conduit 61 from the pressure conduit 62. Placed in the same branch conduit is a second valve 63 which is open, when the torpedo is launched, and which is closed first when the steering is taken under control of the sound receivers. The closing of the valve 63 is effected by an electromagnet 64 which may be connected in circuit in about the same manner as the electromagnet 34 (Fig. 8). When the electromagnet 64 is excited, the valve-operating rod 65 is attracted by the electromagnet 64. A spring 66 or other retaining member thereupon retains the arm 65 in valve-closing position. A valve 68 placed in another branch conduit 67 and normally kept by springs 69 in closed position now controls the steering of the torpedo under the influence of electromagnets controlled by the sound receivers.

It is obvious that the invention is applicable not only for ordinary automobile torpedoes but for any bodies movable in water or air and adapted to be automatically steered by a gyroscope and receivers for waves or vibrations of any kind whatsoever. The term torpedo, wherever used in the specification and claims, is, therefore, to be taken in such a sense as to comprise automatically steerable projectiles or other bodies of any kind whatsoever movable in water or air.

Having now described my invention what I claim is:

1. In a torpedo, the combination of a steering device, a gyroscope connected to the said steering device so as to normally retain the course of the torpedo, receivers sensitive to vibrations of the surrounding medium, connections between the said receivers and the steering device, and means controlled by the said receivers for disconnecting the gyroscope from the steering device when a receiver is actuated.

2. In a torpedo, the combination of a steering device, a gyroscope connected to the said steering device so as to normally retain the course of the torpedo, receivers sensitive to vibrations of the surrounding medium, connections between the said receivers and the steering device, an electric circuit controlled by the said receivers, and an electromagnet included in the said electric circuit and acting to disconnect the gyroscope from the steering device when a receiver is actuated.

3. In a torpedo, the combination of a steering device, a gyroscope connected to the said steering device so as to normally retain the course of the torpedo, receivers sensitive to vibrations of the surrounding medium, connections between the said receivers and the steering device, an electric circuit controlled by the said receivers and the gyroscope, and an electromagnet included in the said electric circuit and acting to disconnect the gyroscope from the steering device when a receiver is actuated.

4. In a torpedo, the combination of a steering device, a gyroscope connected to the said steering device so as to normally retain the course of the torpedo, receivers sensitive to vibrations of the surrounding medium, connections between the said receivers and the steering device, an electric circuit controlled by the said receivers and the gyroscope, and an electromagnet included in the said electric circuit and acting to disconnect the gyroscope from the steering device when it is supplied with current.

5. In a torpedo, the combination of a steering device, a gyroscope connected to the said steering device so as to normally retain the course of the torpedo, receivers sensitive to vibrations of the surrounding medium, connections between the said receivers and the steering device, means for changing the connection between the gyroscope and the steering device corresponding to a desired angle of turning of the torpedo, and means controlled by the receivers for throwing said means into operation when a receiver is actuated.

6. In a torpedo, the combination of a steering device, a gyroscope connected to the said steering device so as to normally retain the course of the torpedo, receivers sensitive to vibrations of the surrounding medium, connections between the said receivers and the steering device, means for successively changing the connection between the gyroscope and the steering device corresponding to a small angle of turning of the torpedo toward the source of vibrations, and means controlled by the said receivers and the gyroscope for throwing said means into operation at intervals.

7. In a torpedo, the combination of steering members, a servomotor operatively connected to the said steering members, a valve for controlling the supply of pressure fluid to the said servomotor for operating same in either direction, a gyroscope connected to the said valve for controlling the position thereof so as to normally retain the course of the torpedo, receivers adapted to be actuated by vibrations of the surrounding medium, electromagnets the circuits of which are controlled by the said receivers, an armature for the said electromagnets connected to the controlling valve for operating same in either direction, and means for disconnecting the gyroscope from the said controlling valve when a receiver is actuated.

8. In a torpedo, the combination of steering members, a servomotor operatively connected to the said steering members, a valve for controlling the supply of pressure fluid to the said servomotor for operating same in either direction, a gyroscope connected to the said valve for controlling the position thereof so as to normally retain the course of the torpedo, receivers adapted to be actuated by vibrations of the surrounding medium, electromagnets the circuits of which are controlled by the said receivers, an armature for the said electromagnets connected to the controlling valve for operating same in either direction, means for changing the connection between the gyroscope and the controlling valve corresponding to a small angle of turning of the torpedo toward the source of vibrations, and means controlled by the said receivers and the gyroscope for throwing said means into operation at intervals.

9. In a torpedo, the combination of steering members, a servomotor operatively connected to the said steering members, a valve for controlling the supply of pressure fluid to the said servomotor for operating same in either direction, a valve-controlling arm connected to the said valve, a gyroscope, an adjustable connection between the said gyroscope and the valve-controlling arm, receivers adapted to be actuated by vibrations of the surrounding medium, electromagnets the circuits of which are controlled by the said receivers and means connected thereto, a second valve-controlling arm forming an armature for the said electromagnets, and means controlled by the receivers and means connected thereto for temporarily disconnecting the gyroscope so as to allow the valve to be operated by the receivers and electromagnets.

10. In a torpedo, the combination of steering members, a servomotor operatively connected to the said steering members, a valve for controlling the supply of pressure fluid to the said servomotor for operating same in either direction, a gyroscope, receivers adapted to be actuated by vibrations of the surrounding medium, steering electromagnets the circuits of which are controlled by the said receivers, an auxiliary electromagnet the circuits of which are controlled by the said receivers and the gyroscope so that the said electromagnet will be temporarily excited when either of the steering electromagnets is energized, valve controlling arms connected to the controlling valve, one of said arms forming a common armature for the steering electromagnets, an armature for the auxiliary electromagnet forming a connection between the gyroscope and the second valve-controlling arm, an arc attached to the gyroscope, and means for keeping the armature of the auxiliary electromagnet engaged by the said arc when the said electromagnet is deprived of current.

11. In a torpedo, the combination of steering members, a servomotor operatively connected to the said steering members, a valve for controlling the supply of pressure fluid to the said servomotor for operating same in either direction, a gyroscope, receivers adapted to be actuated by vibrations of the surrounding medium, steering electromagnets the circuits of which are controlled by the said receivers, an auxiliary electromagnet the circuits of which are controlled by the said receivers and the gyroscope so that the said electromagnet will be temporarily excited when either of the steering electromagnets is energized, valve controlling arms connected to the controlling valve, one of said arms forming a common armature for the steering electromagnets, an armature for the auxiliary electromagnet forming a connection between the gyroscope and the second valve-controlling arm, an arc attached to the gyroscope, means for keeping the armature of the auxiliary electromagnet engaged by the said arc when the said electromagnet is deprived of current, and means for adjusting the angular stroke of the valve-controlling arm actuated by the steering electromagnets.

KARL OSKAR LEON.

Witnesses:
ARTHUR C. FRASER,
THOMAS F. WALLACE.